(12) United States Patent
Spinnato et al.

(10) Patent No.: US 7,828,429 B2
(45) Date of Patent: Nov. 9, 2010

(54) EYEGLASS RETAINER DEVICE

(75) Inventors: Robert Spinnato, Lincoln, CA (US);
Keely Spinnato, Lincoln, CA (US)

(73) Assignee: Spinn Products LLC, Glenbrook, NV (US)

( * ) Notice: Subject to any disclaimer, the term of this patent is extended or adjusted under 35 U.S.C. 154(b) by 0 days.

(21) Appl. No.: 12/319,970

(22) Filed: Jan. 14, 2009

(65) Prior Publication Data

US 2010/0177276 A1    Jul. 15, 2010

(51) Int. Cl.
*G02C 3/00* (2006.01)
(52) U.S. Cl. ...................... 351/156; 351/157
(58) Field of Classification Search .................... 351/41, 351/56, 157, 158, 156
See application file for complete search history.

(56) References Cited

U.S. PATENT DOCUMENTS 4,696,556 A * 9/1987 Perry, III ..................... 351/157
5,369,452 A * 11/1994 Williams ..................... 351/157

FOREIGN PATENT DOCUMENTS

WO    WO 87/07734    * 12/1987    .................. 351/157

* cited by examiner

*Primary Examiner*—Huy K Mai
(74) *Attorney, Agent, or Firm*—Thomas R. Lampe

(57) ABSTRACT

An eyeglass retainer device attachable to an eyeglass frame includes a plurality of flexible tubular segments which are interconnected to form a string of flexible tubular supports and adjustable to change the length of the string. One or more clamps are employed to lock the flexible tubular segments against movement once adjusted.

17 Claims, 2 Drawing Sheets

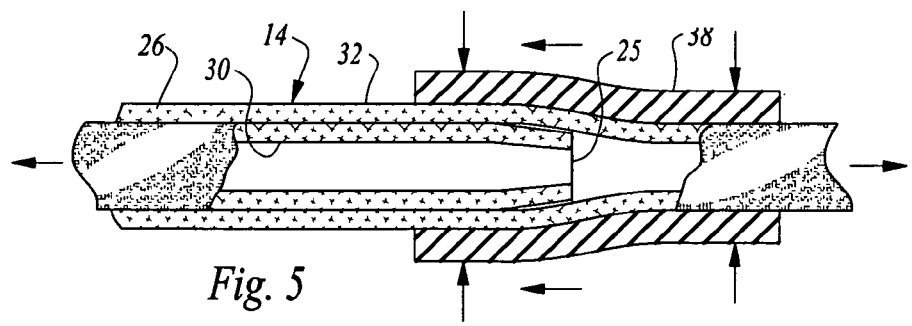
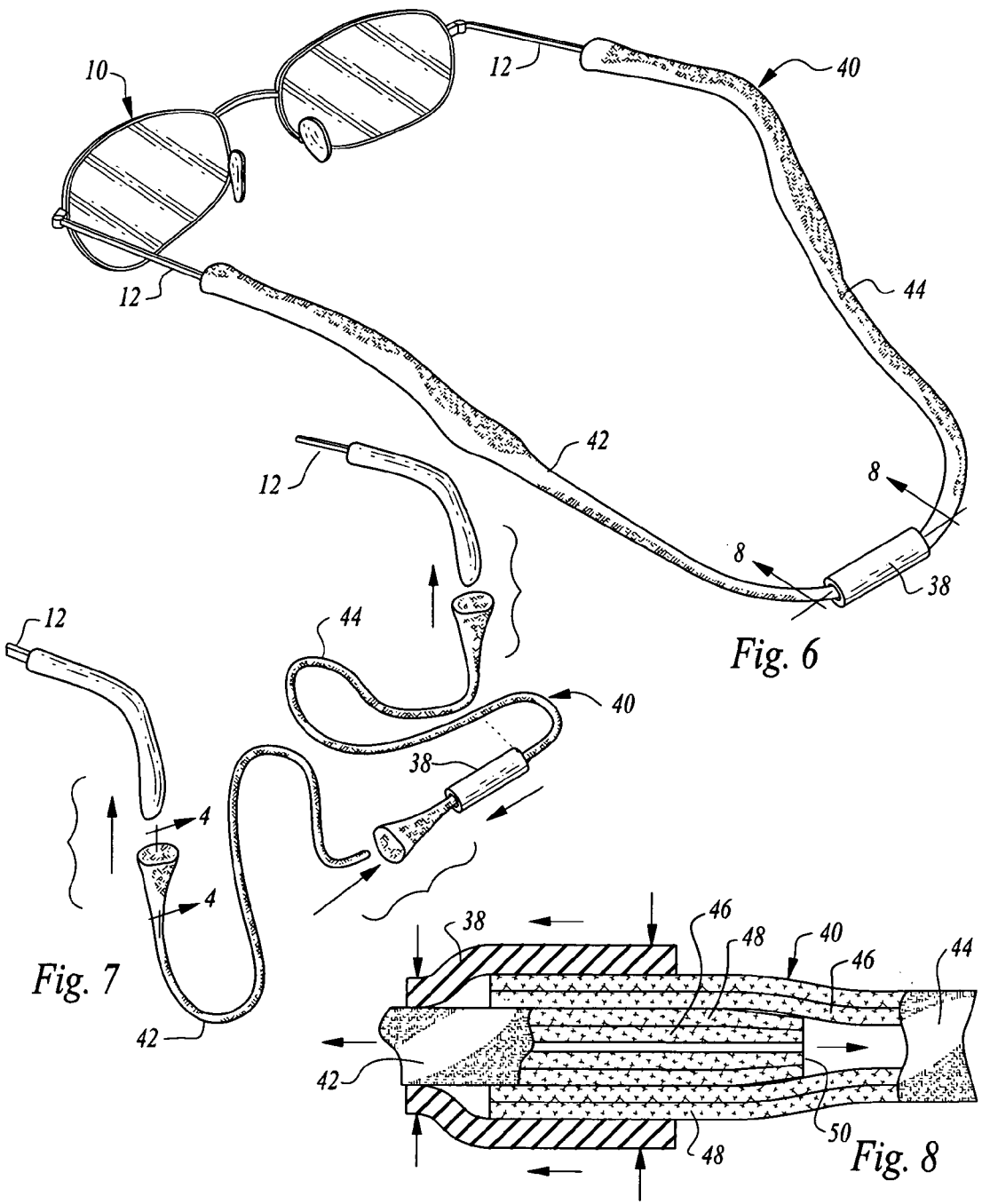

EYEGLASS RETAINER DEVICE

TECHNICAL FIELD

This invention relates to an eyeglass retainer device for maintaining an eyeglass frame having side support arms in position on the head of a user.

BACKGROUND OF THE INVENTION

It is well known to employ retainer devices of various types to keep eyeglasses positioned on the head of an individual. Eyeglass holders which fit around an eyeglass wearer's neck or are secured to the user in some other manner are also known, these devices employed to support the eyeglasses when not in use. Some devices can be utilized in both of these capacities.

Cords and strings are often utilized with eyeglasses as both holders and retainers. Typically, ends of the cords are attached in some manner to the side support arms of the eyeglass frames, the cords forming a loop about the wearer's neck. A number of devices incorporate sliders which slide over two cords or cord sections to tighten them about the head of a user to retain eyeglass frames in place during use. The slider also may be slid relative to the cords to enlarge the effective of size of the loop formed by the cords so that the eyeglasses may be removed and hang from the devices when positioned around the user's neck. Rather than employing cords or strings, it is known to employ sleeves, usually formed of fabric, as retainers or holders, the distal ends of the eyeglass frame support arms being inserted into open ends of the sleeves. In some prior art devices, separate connectors of various types interconnect the cords or sleeves to the eyeglass frames.

DISCLOSURE OF INVENTION

The present invention relates to an eyeglass retainer device which is characterized by its relative simplicity, relatively low cost and ease of use. The retainer device is readily adjustable to either tighten or loosen the fit about a wearer's head. Such adjustment also enables the device to be employed by persons having different head sizes. The retainer device can be adjusted without producing an unsightly "tail" hanging down from the head or neck of the user, as is often the case with respect to prior art devices. The device of this invention expands to fit virtually any sized support arms of eyeglass frames.

Other features, advantages and objects of the present invention will become apparent with reference to the following description and accompanying drawings.

BRIEF DESCRIPTION OF DRAWINGS

FIG. 5 is a greatly enlarged cross-sectional view taken along the line 5-5 of both FIG. 1 and FIG. 3;

FIG. 6 is a view similar to FIG. 1, but illustrating an alternative embodiment of the invention;

FIG. 7 is a perspective, exploded view illustrating portions of two eyeglass frame support arms prior to connection with the retainer device embodiment of FIG. 6, the retainer device being illustrated in disassembled condition; and FIG. 8 is a greatly enlarged cross-sectional view taken along the line 8-8 of FIG. 6.

MODES FOR CARRYING OUT THE INVENTION

Figure 1:
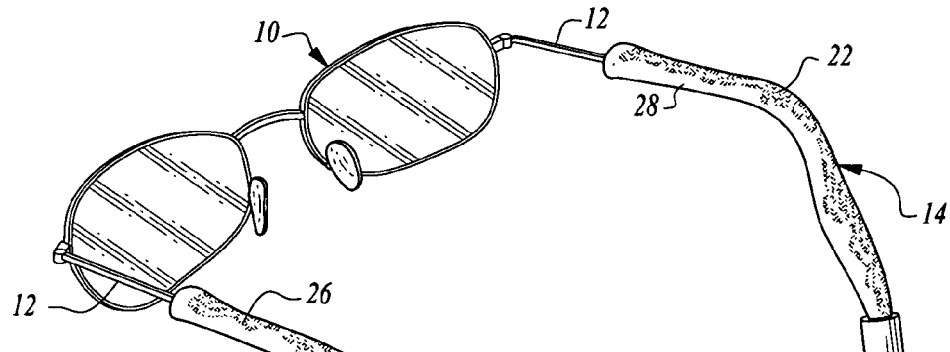
FIG. 1 is a perspective view illustrating an eyeglass retainer device connected to outwardly extending side support arms of an eyeglass frame.
Figure 2:
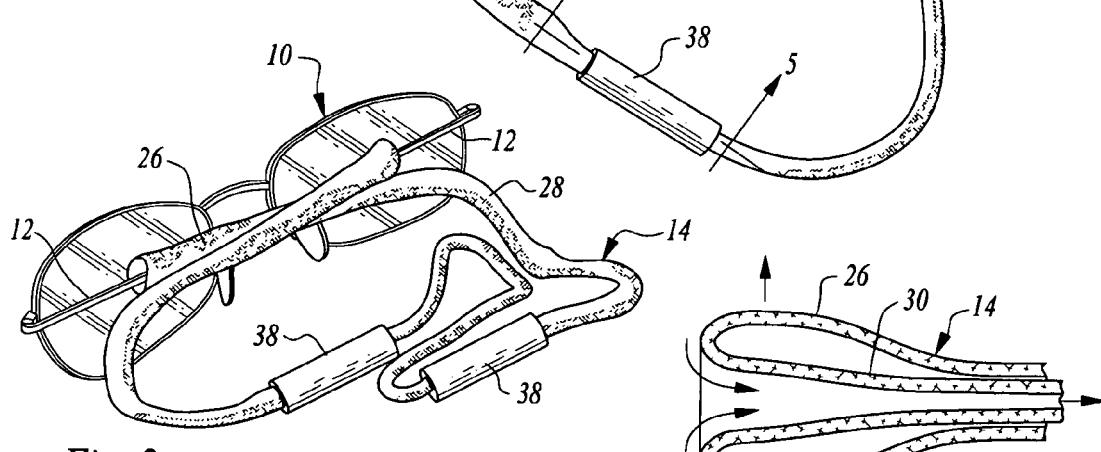
FIG. 2 is a view similar to FIG. 1, but illustrating the support arms collapsed over the rest of the frame and glasses.

Referring now to FIGS. 1-5, a conventional eyeglass frame 10 having side support arms 12 is illustrated. An eyeglass retainer device 14 constructed in accordance with the teachings of the present invention is connected to the side support arms 12, as shown in FIGS. 1 and 2.

Figure 4:
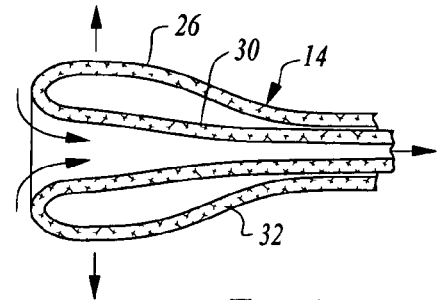
FIG. 4 is a greatly enlarged cross-sectional view taken along the line 4-4 of FIG. 3 and FIG. 7.
Figure 3:
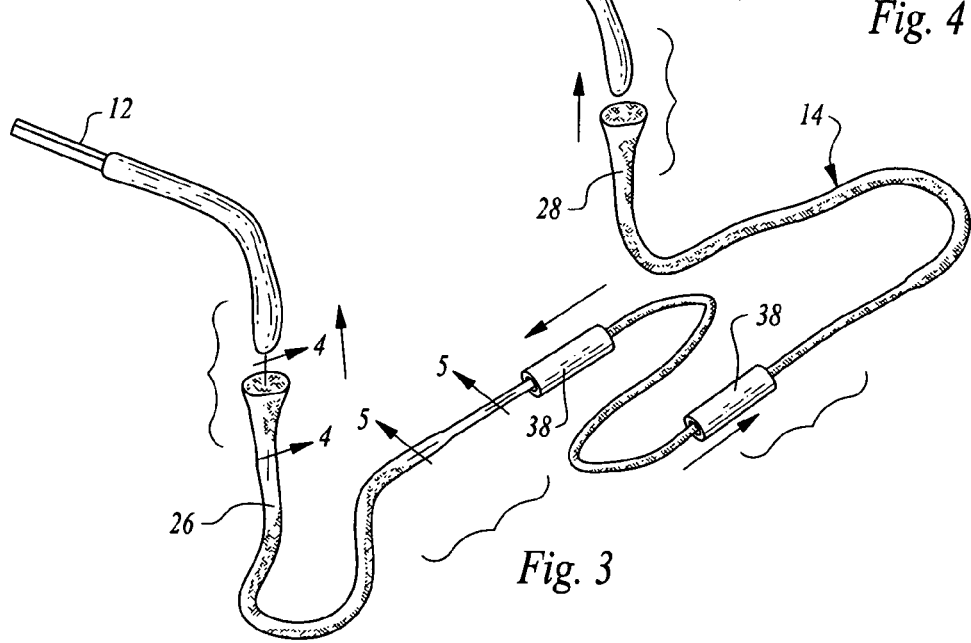
FIG. 3 is an exploded, perspective view illustrating portions of side support arms of the eyeglass frame prior to connection of the retainer device thereto, the retainer device being shown partially assembled.

Eyeglass retainer device 14 includes two tubular segments 20, 22 forming a string of connected flexible tubular segments. In this embodiment, the segments comprise integral segments of a single piece of flexible tubular material. That is, the string is a single flexible tube. The tube has ends 25 and is doubled back upon itself to form spaced end portions 26, 28. FIG. 4 shows end portion 26 and end portion 28 is of like construction. Each end portion has an inner tube layer 30 and an outer tube layer 32. The outer tube layer 32 surrounds the inner tube layer 30 and the associated end 25 (see FIG. 5).

In the disclosed eyeglass retainer device 14, end portion 26 of tubular segment 20 forms an opening and receives one side support arm 12 of the eyeglass frame while end portion 28 of tubular segment 22 forms an opening receiving the other side support arm 12 (see FIGS. 1 and 2). The end portions 26, 28 slide over the side support arms and the inner tube layers thereof are in frictional engagement with the side support arms to maintain the tubular segment on the eyeglass frames.

In a preferred embodiment, the tubular segments 20, 22 are formed of expandable braided material, an especially suitable material being braided filaments of polyethylene terephthalate polymer, a material that is waterproof and which will expand to fit virtually any eyeglass frame side support arms.

Once the side support arms are positioned in place, they resist being pulled away from the end portions. Due to the fact that the tubular segments are formed of expandable braided material such as braided filaments of polyethylene terephthalate polymer, the end portions act in the manner of a "Chinese finger trap", reducing in circumference and tightening when subjected to a pulling force of the end portions. Thus a tight interconnection exists between the side support arms and the end portions.

It will be appreciated that the overall length of the flexible tube can be varied by lengthening or shortening the lengths of the end portions. This of course will depend upon how far in the ends 25 are inserted when the tube is doubled over. This allows ready adjustment to fit a wearer's head. Once adjustment has been made, clamps in the form of tubular-shaped couplers 38 are utilized to exert clamping forces on end portions 26, 28. Two tubular-shaped couplers 38 surround the string of connected flexible tubular segments in frictional engagement therewith and are manually slidable relative thereto. FIG. 5 shows one clamp or coupler 38 exerting clamping forces on the inner and outer tube layers of doubled-over end portion 26 of tubular segment 20. The couplers 38 may be formed of any suitable material such as resilient rubber. In addition to increasing the frictional engagement between the inner tube layers 30, 32, couplers 38 cover the locations of ends 25 and provide a more finished appearance.

FIGS. 6, 7 and 8 illustrate a second embodiment 40 of the eyeglass retainer device. This embodiment includes two completely separable tubular segments 42, 44 and only one coupler 38. This is to be compared with the first embodiment described above wherein the tubular segments are parts of a single piece of tubing.

It will be appreciated that the tubular segments 42, 44 cooperate with one another and with coupler 38 in a somewhat different manner than described above with respect to the tubular segments 20, 22 and couplers 38 of the embodiment of FIGS. 1-5.

In the FIGS. 6-8 embodiment, each of the tubular segments 42, 44 is doubled over the entire length thereof to form an inner tube layer 46 and a surrounding outer tube layer 48. One end 50 of tubular segment 42 is slid through an open end of tubular segment 44 and into tubular segment 44 to form a telescopic connection. The location of tubular segment 42 relative to tubular segment 44 is adjusted until the desired overall length of the string comprised of the segments is obtained. The unconnected ends of the tubular segments 42, 44 receive frame side support arms 12 as described above with respect to the first embodiment.

In both embodiments described, adjustment of the tubular segments relative to the frame readily accomplished. Adjustment relative to the side support arms is merely a matter of sliding the tubular segments thereon to the desired positions. In FIGS. 6-8 embodiment, the overall length of the string formed by the tubular segments can also be varied by moving the tubular segments at a connection toward or away from one another, this being accomplished after the coupler 38 has been slid to a non-clamping position on the string of tubular segments. While some resistance to relative movement still exists when the tubular segments are being pulled apart due to the "Chinese finger trap" effect, this can be overcome by manually manipulating the tubular segments.

It will be appreciated that the materials employed in the construction of the eyeglass retainer device can be of any suitable type having the desired characteristics noted above. Furthermore, the tubular segments need not be a single color. Each tubular segment may be multi-colored and the colors of different tubular segments may be different.

The invention claimed is:

1. An eyeglass retainer device for mounting an eyeglass frame having side support arms in position on the head of a user, said eyeglass retainer device including a flexible tube having tube ends, said tube being doubled back upon itself to form two end portions, each end portion having an inner tube layer and an outer tube layer, said outer tube layer surrounding said inner layer and a tube end, said end portions defining openings for receiving said side support arms, with said inner tube layers of said end portions in frictional engagement with said support arms to maintain the eyeglass retainer device on said eyeglass frame, said eyeglass retainer device additionally including a pair of clamps, said clamps being spaced from one another, spaced from the support arms and selectively movable relative to one another, one of said clamps surrounding and in frictional engagement with one of said end portions to clamp and apply compressive forces to the inner tube layer and outer tube layer thereof to substantially prevent slidable movement therebetween and the other of said clamps surrounding and in frictional engagement with the other of said end portions to clamp and apply compressive forces to the inner tube layer and outer tube layer thereof to substantially prevent slidable movement therebetween, said clamps covering the locations of the tube ends.

2. The eyeglass retainer device according to claim 1 wherein said tube is of single piece construction and comprises a string of integrally connected flexible tubular segments.

3. An eyeglass retainer device for maintaining an eyeglass frame having side support arms in position on the head of a user, said eyeglass retainer device including a plurality of tubular segments forming a string of connected tubular segments, at least one of said connected tubular segments being received in another of said connected tubular segments to form a connection therebetween, and end portions of two of said connected tubular segments for connection to said side support arms.

4. The eyeglass retainer device according to claim 3 wherein the connected tubular segments forming said connection are flexible tubular segments in frictional engagement.

5. The eyeglass retainer device according to claim 4 wherein said connection is a telescopic connection enabling adjustment of the length of said string of connected flexible tubular segments to be selectively lengthened or shortened by changing the relative positions of the connected tubular segments forming said connection.

6. The eyeglass retainer device according to claim 5 additionally comprising a clamp selectively positionable on said string of connected flexible tubular segments to exert clamping forces on the connected tubular segments forming said connection to increase frictional engagement therebetween.

7. The eyeglass retainer device according to claim 6 wherein said clamp comprises a resilient coupler surrounding said string of connected flexible tubular segments in frictional engagement therewith and slidable relative thereto.

8. The eyeglass retainer device according to claim 4 wherein said flexible tubular segments are formed of expandable braided material which expands to allow said end portions to expand when receiving said side support arms and contracts when a pulling force is exerted thereon to tighten the frictional engagement between the end portions and said side support arms.

9. The eyeglass retainer device according to claim 8 wherein said expandable braided material comprises braided filaments of polyethylene terephthalate polymer.

10. The eyeglass retainer device according to claim 4 wherein said at least one of said connected flexible tubular segments differs in color from other of said connected flexible tubular segments.

11. The eyeglass retainer device according to claim 3 wherein said flexible tubular segments are selectively completely separable from one another.

12. In combination:
an eyeglass frame having side support arms; and
an eyeglass retainer device including a flexible tube having tube ends, said tube forming two end portions defining openings receiving said side support arms, with said end portions in frictional engagement with said support arms to maintain the eyeglass retainer device on said eyeglass frame, said flexible tube including a plurality of flexible tubular segments forming a string of connected flexible tubular segments, at least one of said connected flexible tubular segments being received in another of said connected flexible tubular segments to form a connection therebetween.

13. The combination according to claim 12 wherein the connected flexible tubular segments forming said connection are in frictional engagement.

14. The combination according to claim 13 wherein said connection is a telescopic connection enabling adjustment of the length of said string of connected flexible tubular segments to be selectively lengthened or shortened by changing the relative positions of the connected tubular segments forming said connection.

15. The combination according to claim 12 additionally comprising a clamp selectively positionable on said string of connected flexible tubular segments to exert clamping forces on the connected tubular segments forming said connection to increase frictional engagement therebetween.

16. The combination according to claim 15 wherein said clamp comprises a resilient coupler surrounding said string of connected flexible tubular segments in frictional engagement therewith and slidable relative thereto.

17. The combination according to claim 12 wherein said flexible tube is formed of expandable braided material which expands to allow said end portions to expand when receiving said side support arms and contracts when a pulling force is exerted thereon to tighten the frictional engagement between the end portions and said side support arms.

* * * * *